United States Patent [19]

King

[11] 4,429,957
[45] Feb. 7, 1984

[54] PANORAMIC ZOOM LENS ASSEMBLY

[75] Inventor: Don G. King, Lewisville, Tex.

[73] Assignee: King-Bell Optics, Inc., Lewisville, Tex.

[21] Appl. No.: 288,656

[22] Filed: Jul. 30, 1981

[51] Int. Cl.³ .................. G02B 13/06; G02B 15/14
[52] U.S. Cl. ................................ 350/423; 350/440; 350/441; 350/445
[58] Field of Search ............... 350/423, 441, 440, 445

[56] References Cited

U.S. PATENT DOCUMENTS

| | | | |
|---|---|---|---|
| 1,653,575 | 12/1927 | Kirtane | 350/441 |
| 2,176,554 | 10/1939 | Hardy | 350/441 |
| 2,244,235 | 6/1941 | Ayres | 350/441 |
| 2,651,237 | 9/1953 | Garutso | 350/440 |
| 3,594,067 | 7/1971 | Garbati | 350/441 X |
| 3,846,809 | 11/1974 | Pinzone et al. | 350/441 |
| 4,326,775 | 4/1982 | King | 350/441 X |

FOREIGN PATENT DOCUMENTS 1155544  6/1969  United Kingdom ............... 350/441

Primary Examiner—John K. Corbin
Assistant Examiner—Scott J. Sugarman
Attorney, Agent, or Firm—Hubbard, Thurman, Turner & Tucker

[57] ABSTRACT

A panoramic zoom lens assembly of the type including a reflector lens spaced from the image plane of an optical recording device such as a film camera or video camera is disclosed. The zoom lens assembly includes a cylindrical housing having a transparent sidewall portion and an opaque sidewall portion with a reflector mounted in optical communication with the transparent sidewall zone. The reflector is provided with a symmetrical, reflective surface of revolution the axis of which is transverse to the image plane. An annular, objective lens assembly is mounted within the housing in a fixed position surrounded by the opaque housing sidewall portion. An intermediate annular lens is mounted within the housing for reciprocal movement along the reflector axis between the objective lens and the image plane. Displacement of the movable annular lens varies the focal length of the overall lens assembly. In a preferred embodiment, a third annular lens is mounted in a fixed position between the movable annular lens and the image plane whereby the assembly can be mounted directly onto a camera housing.

1 Claim, 3 Drawing Figures

PANORAMIC ZOOM LENS ASSEMBLY

BACKGROUND OF THE INVENTION

1. Field of the Invention

This invention relates to panoramic optical systems, and more particularly to a panoramic zoom lens assembly.

2. Description of the Prior Art

A widely used method for providing continuous surveillance over a predetermined area is by video transmission. The must elemental video surveillance system consists of a single camera connected to a video monitor through a closed circuit transmission line. The video camera converts the virtual image of the area being scanned into electrical impulses which make up the video signal. In the surveillance of panoramic scenes it has been customary to use a single camera mounted on a support and rotatable about a vertical axis whereby a succession of images representative of the panoramic view are produced. In such systems the video camera is focused at successive points and therefore is not capable of monitoring all points within the panoramic scene simultaneously.

Complete acceptance and widespread use of the foregoing approach has been limited by the complexity and expense of equipment required to provide continuous surveillance of multiple locations. To minimize the equipment required, a panoramic optical lens has been developed which produces a virtual image of a panoramic view in the form of a continuous annular projection.

The annular image is projected upon the target surface of a video camera and is scanned in a horizontal scanning pattern. The image reproduced in the video receiver is an exact duplicate of the annular image including a central region of the raster surface of the video receiving tube which is unused. In order to make efficient use of the raster surface of the video picture tube, the annular image is "spread" or transformed into a rectangular image in which the complete panoramic view is portrayed on the receiver screen without image inversion, as set forth in my co-pending U.S. patent application Ser. No. 159,613, filed June 16, 1980, now U.S. Pat. No. 4,327,312 entitled "Circular Raster Sweep Generator".

A panoramic reflector has been developed which includes an outer circumscribing reflective surface of revolution, the axis of which is concentric with the viewing axis and is thus perpendicular to the image plane. The reflective surface of such lens is typically coated with a reflective material and the incoming rays are imaged in the form of an annulus on the focal plane. Conventional panoramic reflectors of the foregoing type have been limited somewhat because of image distortion and washout due to light ray interference, as well as the lack of ability to focus the image on the image plane. In particular, prior art panoramic reflector systems have heretofore not provided zoom focusing capability.

OBJECTS OF THE INVENTION

It is, therefore, the principal object of the present invention to provide a new and improved lens system for a panoramic optical recorder or the like.

Another object of the invention is to provide an improved panoramic optical system having zoom focusing capability for use in combination with a film camera or a video camera.

A related object of the invention is to provide a panoramic optical lens having improved focusing capability.

SUMMARY OF THE INVENTION

In accordance with these and other objects, a panoramic lens assembly is provided with zoom focusing capability by the combination of a reflector lens, an annular objective lens, and a movable, annular focusing lens. The lens assembly is enclosed within a cylindrical housing having a transparent sidewall portion and an opaque sidewall portion with a reflector mounted in optical communication with the transparent sidewall portion. The reflector is provided with a symmetrical, reflective surface of revolution the axis of which is transverse to the image plane. The objective lens assembly is mounted within the housing in a fixed position surrounded by the opaque sidewall zone, but within the projection path of the reflector. The annular focusing lens is mounted within the housing for reciprocal movement along the reflector axis between the objective lens and the image plane. Displacement of the movable annular lens varies the focal length of the overall lens assembly.

The panoramic zoom lens assembly can be mounted as an attachment directly to the lens of a camera. In an alternate embodiment, a third annular lens is mounted in a fixed position between the movable annular lens and the image plane whereby the assembly can be mounted directly onto the camera housing.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENT

Figure 1:
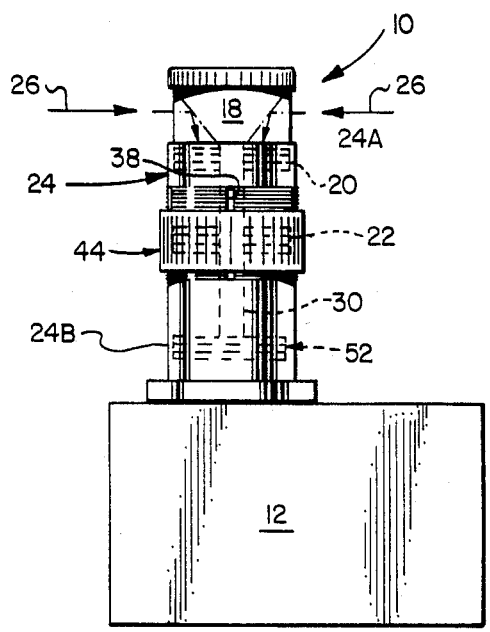
FIG. 1 is an elevation view of a panoramic zoom lens assembly mounted on a video camera.

In the description which follows, like parts are marked throughout the specification and drawings with the same reference numerals, respectively. The drawings are not necessarily to scale, and in some instances, portions have been exaggerated to in order to more clearly depict certain features of the invention.

Figure 2:
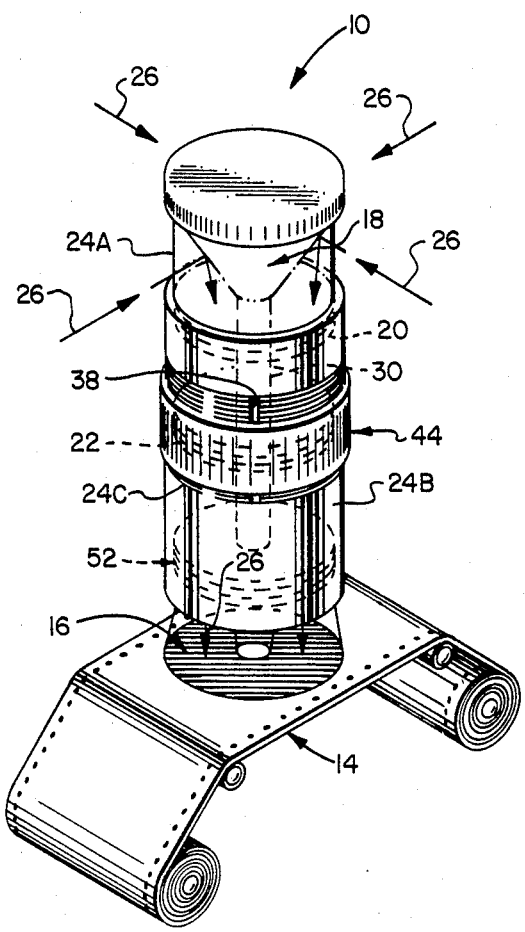
FIG. 2 is a perspective view which illustates the operation of the panoramic zoom lens assembly as it projects an annular image onto a strip of film; and, FIG. 3 is a sectional view of the panoramic zoom lens assembly of the invention.

Referring now to FIGS. 1 and 2, a panoramic zoom lens assembly 10, constructed according to the teachings of the present invention, may be used in combination with a video camera 12 having a light sensitive target surface (not illustrated) onto which an annular image is focused, or in combination with a conventional camera (not illustrated) having a film strip 14 onto which an annular image 16 is projected.

A first preferred embodiment of the panoramic zoom lens assembly 10 includes a reflector 18, an objective lens group 20, and a movable focusing lens group 22.

These components are enclosed within a cylindrical housing 24 having a transparent sidewall portion 24A and an opaque sidewall portion 24B. The transparent sidewall 24A defines a window through which light rays 26 are transmitted onto the reflective surface 18A.

The reflector 18 may have a wide variety of configurations, with its outer reflective surface 18A being symmetrical about an axis of revolution 28. The axis of revolution 28 is coincident with the focal axis. The outer surface 18A may be convex, concave, conical or frusto-conical in form. In the preferred embodiment shown in FIG. 3, the reflector 18 has a conical configuration with the outer surface 18A being coated with a reflected material.

The reflector 18 reflects light rays 26 impinging over an azimuth range of three hundred sixty degree (360°) panoramic view downwardly through the objective lens group 20 and the focusing lens group 22, with the reflected annular image 16 being reproduced in an annular image onto the image plane as indicated in FIG. 2. Accordingly, the cylindrical zone 24A is completely transparent to make possible the collection of light rays by the reflector 18.

Figure 3:
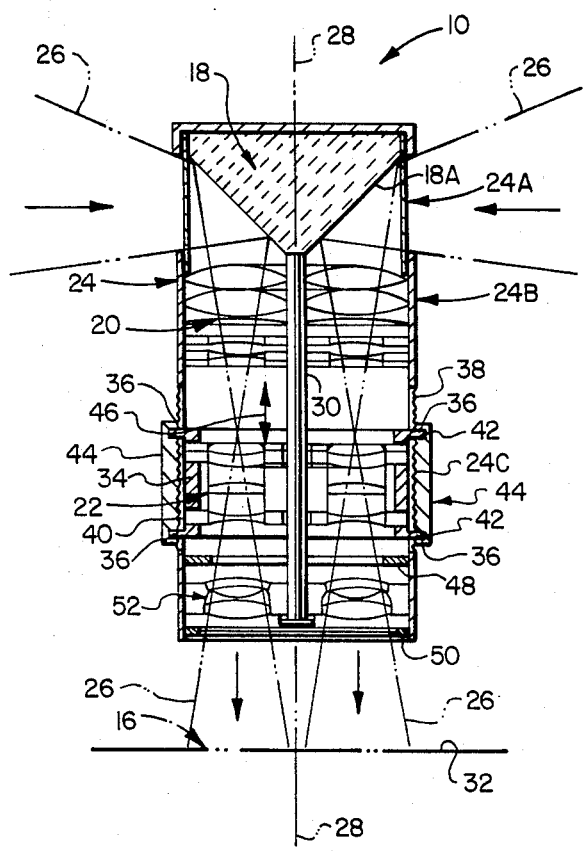

In accordance with a unique feature of the present invention, and with additional reference to FIG. 3, the apex of the conical reflector 18 is connected to a support tube 30 which extends throughout the length of the cylindrical housing 24. The support tube 30 is preferably cylindrical and is used to stabilize the reflector 18, the objective lens group 20, and to provide a guide surface along which the movable lens group 22 slides as it is displaced through the housing.

The support tube 30 also eliminates undesirable light ray interference in the area between the reflector 18 and the image plane 32. Preferably, the outer surface of the support tube 30 is coated with non-reflective paint to prevent over-exposure and washout of the annular image.

Referring now to FIG. 3, the objective lens group 20 comprises a compound assembly of annular lens, some of which are convergent and some of which are divergent. The objective lens group 20 is mounted immediately below the reflector 18 and is completely surrounded by the opaque sidewall 24B. Each lens of the objective group 20 is annular in form and is fitted around the support tube 30. The objective lens group 20 is secured in place and is stabilized by the support tube 30.

The focal length of the lens assembly 10 is varied by displacing the lens group 22 along the guide tube 30. The movable lens group 22 is a compound combination of convergent and divergent lenses. Each lens in the group is annular, with the group being mounted for sliding movement along the guide tube 30.

The lenses of the movable group 22 are mounted and stabilized upon a carriage frame 34. Projecting radially from the carriage frame 34, on opposite sides of the lens assembly, are tang projections 36. The tang projections 36 project radially through vertical slots 38, 40 on the right and left sides of the cylindrical housing, respectively. The tangs 36 are engaged within annular slots 42 of a threaded adjustment cylinder 44. The adjustment cylinder 44 is engaged with a threaded sidewall portion 24C of the lens housing. Thus, as the adjustment cylinder 44 turns along the threaded housing surface 24C, the intermediate lens group 22 is displaced along the focal axis 28 as indicated by the arrow 46, thereby changing the focal length of the lens assembly.

Immediately below the movable lens group 22 is a field of view diaghragm plate 48, and immediately below the diaphragm plate is a shutter assembly 50. Secured between the diaphragm plate 48 and the shutter assembly 50 is a focusing lens group 52. In this arrangement, the panoramic zoom lens assembly 10 can be connected directly to the lens opening of a camera housing. If desired, however, the panoramic zoom lens assembly 10 can be constructed without the focusing lens group 52, in which case the zoom lens assembly 10 serves as an attachment to an existing focusing lens. In either arrangement, the focal length is continuously variable by displacing the movable lens group 22 along the focal axis 28.

Although preferred embodiments of the invention have been described in detail, it should be understood that various changes, substitutions and alterations can be made therein without departing from the spirit and scope of the invention as defined by the appended claims.

What is claimed is:

1. A zoom lens assembly for focusing the image of a panoramic view onto an image plane comprising, in combination:

a cylindrical housing having a transparent sidewall zone and an opaque sidewall zone;

a reflector mounted in said housing in optical communication with the transparent sidewall zone, said reflector having a symmetrical, reflective surface of revolution the axis of which is transverse to the image plane;

a first annular lens mounted with said housing in a position surrounded by said opaque sidewall zone;

a guide tube received within said housing and extending along the axis of said reflector through said first annular lens;

a second annular lens received within said housing and movably mounted in concentric alignment with said first annular lens for reciprocal movement along said guide tube between the first annular lens and the image plane; and, carriage means received within said housing and mounted for movement along said guide tube, said second annular lens being mounted onto said carriage means.

* * * * *